United States Patent [19]

Nahas

[11] Patent Number: 4,881,703
[45] Date of Patent: Nov. 21, 1989

[54] AIRCRAFT FLAP ASSEMBLY

[76] Inventor: Roger A. Nahas, 17001 Adlon Rd., Encino, Calif. 91436

[21] Appl. No.: 211,557

[22] Filed: Jun. 27, 1988

[51] Int. Cl.$^4$ .............................................. B64C 3/58
[52] U.S. Cl. .................................................. 244/213
[58] Field of Search ............... 244/211, 212, 213, 214, 244/215, 216, 217, 113, 110 D

[56] References Cited

U.S. PATENT DOCUMENTS

| | | | |
|---|---|---|---|
| 1,841,804 | 1/1932 | Hall | 244/213 |
| 1,875,593 | 9/1932 | Hall | 244/213 |
| 2,007,086 | 7/1935 | Hall | 244/215 |
| 3,127,130 | 3/1964 | Lyon | 244/215 |

Primary Examiner—Joseph F. Peters, Jr.
Assistant Examiner—Anne Sartelle
Attorney, Agent, or Firm—Jack C. Munro

[57] ABSTRACT

A flap assembly attached to the undersurface of a wing of an aircraft. The size of the flap has been precisely designed in view of the size of the wing of the aircraft and also precisely located relative to the wing of the aircraft so that the flap can be used as an air brake to substantially slow the speed of the aircraft when landing without loss of lift thereby utilizing substantially less runway during landing. Also, the flap assembly can be deployed to increase lift for the purpose of utilizing substantially less runway during take-off.

1 Claim, 2 Drawing Sheets

AIRCRAFT FLAP ASSEMBLY

BACKGROUND OF THE INVENTION

The field of this invention relates to aircraft and more particularly to a new and novel auxiliary wing assembly which permits the aircraft to land and take-off in a substantially shorter distance.

The use of flaps in aircraft is exceedingly conventional. It is common that the flaps are to be located at the trailing edge of the wing of the aircraft. The primary purpose of the flaps is to increase lift and also decrease the speed of the aircraft. Generally, these flaps are used during landing of the aircraft.

The following United States Patents have come to the present inventor's attention as being allegedly similar to the structure of the present invention. These references are: 1,600,671 - Hill; 1,992,158 - Hall; 2,043,275 - Weick; 2,226,811 - Evans; 2,278,562 - Raymond; 2,352,074 - Brown et al; 2,353,303 - Gray; 3,127,130 - Lyon; 3,259,341 - Steidl; 3,371,888 - Alvarez-Calderon; 4,398,683 - Schmetzer. Probably, the reference most similar is that to Lyon. Lyon shows a double flap system associated with the undersurface of the wing with this flap system being deployable to provide for slower landings and take-offs of the aircraft. The structure of the present invention is different in that it is refined to a much greater extent. This refinement has to do with the utilizing of a particular size relationship between the flap of the wing as well as precise location of the flap onto the wing. Additionally, there is to be formed an air gap between the flap and the wing and it is preferable that this air gap be of a certain size. It has been found that if one were to use this certain size relationship that substantially, significant improved aircraft characteristics are obtained which were not heretofore possible.

SUMMARY OF THE INVENTION

The control surface assembly of this invention, though referred to as a flap and a flap assembly, in reality it would probably be more accurate to refer to this invention as an auxiliary wing and auxiliary wing assembly. A flap assembly to be mounted in conjunction with an aircraft wing where there is an air gap located between the flap and the undersurface of the wing. The flap is to be hingedly movable relative to the wing between a stowage position and a deployed position with the deployed position being some angular relationship from zero to ninety degrees relative to the undersurface of the wing. The length of the flap is at least two-thirds of the length of the wing with the cord of the flap equalling approximately one-fourth the cord of the wing. The air gap between the flap and the undersurface of the wing equals approximately three-eighths of the cord of the flap. The hinge axis for the flap assembly is mounted to the undersurface of the wing at approximately five-eighths of the distance from the trailing edge of the wing.

One of the primary objectives of the present invention is to construct a flap system which will permit the aircraft to land at a much steeper angle of descent than was heretofore possible thereby permitting the aircraft to land on much shorter runways than was heretofore possible.

Another object of the present invention is to construct a flap system which can be deployed during take-off of the aircraft which will significantly increase the lift of the aircraft permitting the aircraft to take-off in a significantly shorter distance.

Another objective of the present invention is to permit a light aircraft to make an emergency landing in an exceedingly limited landing space with this emergency landing occurring at a significantly decreased speed thereby minimizing not only possible damage to the aircraft but also minimizing potential injury to occupants of the aircraft.

Another objective of the present invention is that it lends itself to quick and easy retrofitting of existing aircraft without requiring substantial reconstruction of the aircraft. Therefore, this retrofit can occur at a minimum expense.

Another objective of the present invention is to permit the aircraft to approach and land at a steep angle such as forty-five degrees without any buildup of speed of the aircraft no matter what the length of the approach.

Another objective of the present invention is that when deployed the full control of the guide path of the aircraft is preserved with the ability to jaw, roll and pitch while allowing for a final quick transition to level flight just before touchdown.

Another objective of the present invention is to provide a favorable enough lift/drag ratio to allow for take-off of the aircraft at one-third to one-half the distance needed by conventional aircraft.

Another objective of the present invention is that no longer is the pilot required to start the approach to the landing field well prior to reaching of the landing field and that the aircraft can start the final approach of an altitude which is in excess of what is preferred without any deleterious affects.

Another objective of the present invention is that in emergency situation, just before the projected impact, an instant lift boost is provided which is enough of a lift to result in a controlled stall very near the ground. This procedure, thus, significantly eliminates damage to the aircraft.

Another objective of the present invention is that the flap assembly may be deployed to avoid a mid-air collision.

Another objective of this invention is that it provides an unusually large amount of braking force yet preserving full lift of the aircraft wing.

Another objective of the present invention is that the aircraft can be operated at level flight with the flap assembly in the fully deployed position.

DETAILED DESCRIPTION OF THE SHOWN EMBODIMENT

Figure 1:
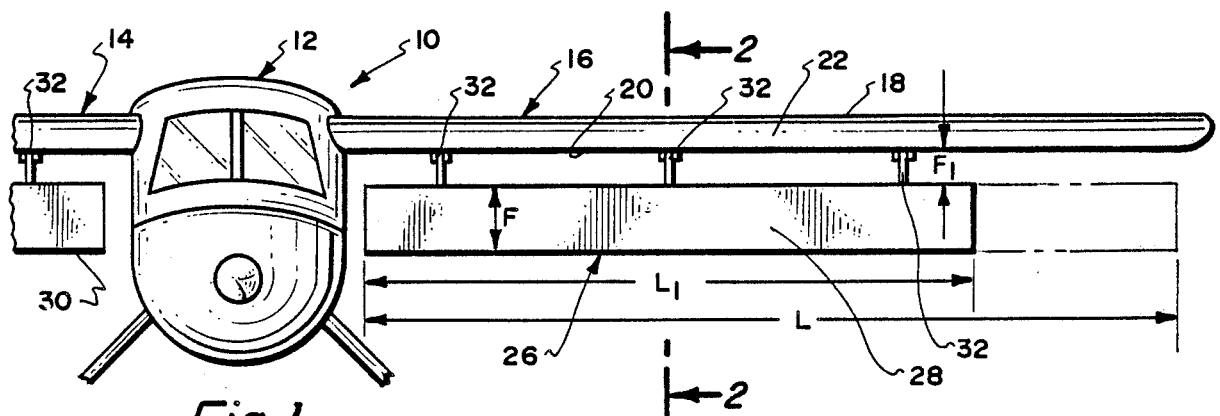
FIG. 1 is a front elevational view of a left wing of a small light aircraft within which has been incorporated the flap assembly of the present invention.

Referring particularly to the drawings there is shown an aircraft 10 which has a fuselage 12, a right wing 14 and a left wing 16. The left wing 16 includes a top surface 18 and an undersurface 20, a leading edge 22 and a trailing edge 24. Mounted to the undersurface 20 is the flap assembly 26 of the present invention. It is to be understood that this flap assembly 26 will include a component under the right wing 14 as well as the component located under the left wing 16. It is to be understood that basically these components are identical and will be deployed simultaneously.

The flap assembly 26 comprises a flap 28 associated with the left wing 16 and a flap 30 associated with the right wing 14. The following description will apply only to flap 28. However, it is to be understood that the same description will also be applicable to flap 30.

The flap 28 is shown constructed of thin sheet material which when observed from the front of the aircraft and, with the flap 28 in full deployment, is rectangular in configuration having a length $L_1$ and a width F. Normally, this flap 28 will be constructed of a metallic material. However, a plastic composite material may also be utilized.

The flap 28 is fixedly attached to a plurality of brackets 32. These brackets 32 are to be located in a spaced apart manner. THere are actually three in number of the brackets 32. However, this number can be readily increased or decreased without departing from the scope of this invention.

Figure 2:
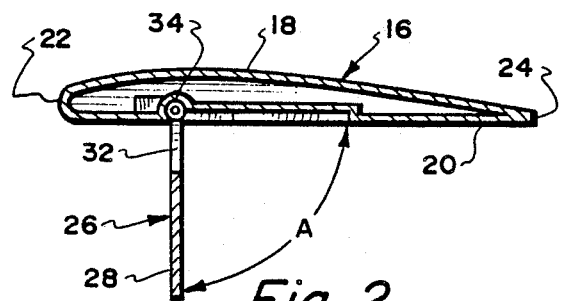
FIG. 2 is a cross-sectional view through the aircraft wing of FIG. 1 taken along line 2—2 of FIG. 1 showing the flap assembly in the fully deployed position.
Figure 3:
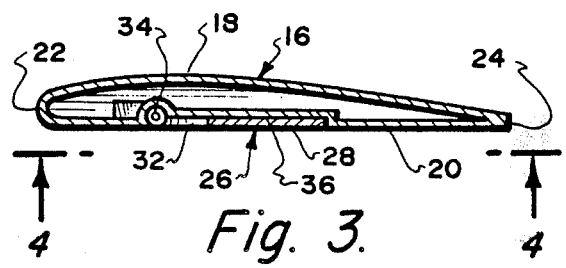
FIG. 3 is a cross-sectional view similar to FIG. 2 but showing the flap assembly in the stowage position.
Figure 4:
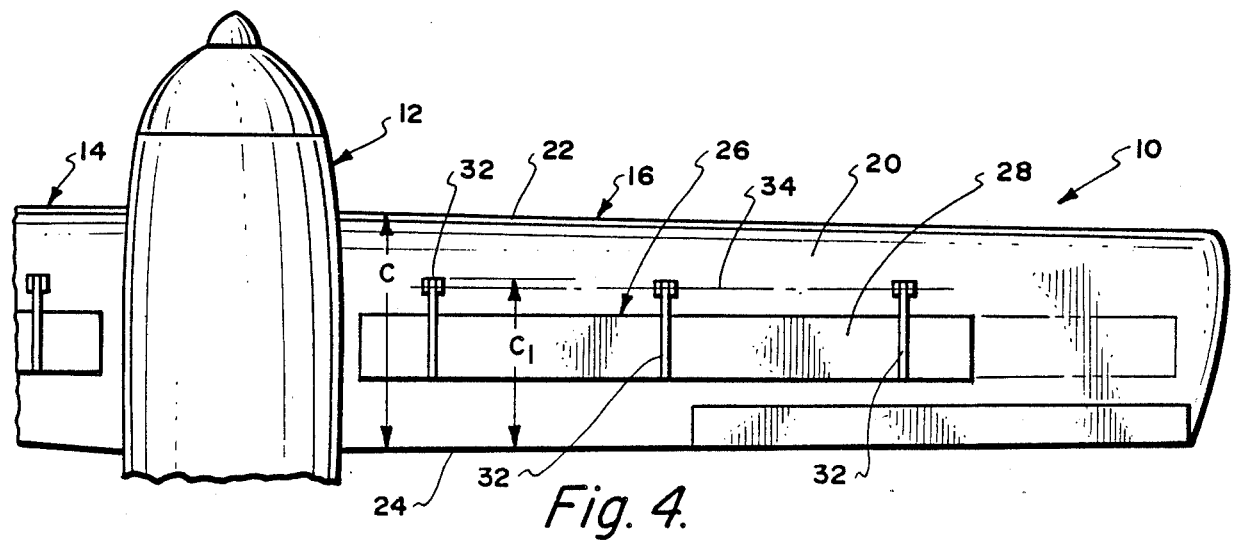
FIG. 4 is a bottom plan elevational view of the aircraft wing showing the flap assembly in the stowage position taken along line 4—4 of FIG. 3.

These brackets 32 are hingedly mounted along the hinge axis 34 to the undersurface 20. This undersurface 20 may be specially configured to form a pocket 36 to permit stowage of the flap 28 when not in use. It is to be understood that there will be an appropriate actuator assembly (not shown) that will be incorporated in conjunction with the flap 28 in order to cause movement of the flap 28 to a deployed position and hold that flap 28 in its established deployed position. This deployed position can be any position from the stowage position to the fully deployed position in FIG. 2 which is ninety degrees relative to the undersurface 20. This angle of deployment of flap 28 is represented by angle "A" in FIG. 2.

Figure 5:
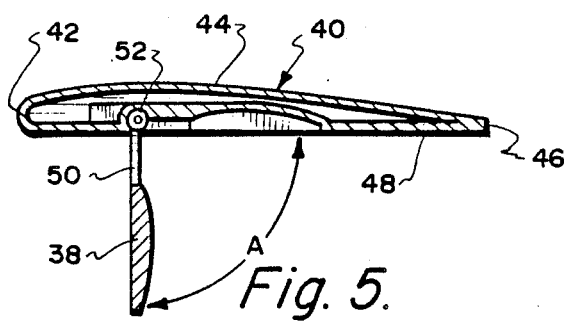
FIG. 5 is a view similar to FIG. 2 of a modified form of flap assembly wherein the flap itself comprises an airfoil.

The embodiment of this invention shown in FIGS. 1 through 4 constitutes an air brake. The flap 28 also increases lift. At any angle of deployment such as between twenty to ninety degrees, the signigicant increase in lift is substantially the same. However, at ninety degrees, the braking force is much greater than at twenty degrees. This presence of lift, even at ninety degrees, causes the aircraft to change easily from a steep descent to level flight when the flap assembly is deployed. Further increased lift can be obtained by designing of the flap 38 to be an airfoil. This airfoil representation is clearly shown within FIG. 5 where there is depicted a wing 40. In a similar manner, which previously has been described in relation to wing 16, the wing 40 has a leading edge 42, a top surface 44, a trailing edge 46 and an undersurface 48. The flap 38 is mounted by means of a plurality of brackets 50 on the hinge axis 52 at the undersurface 48 of the wing 40.

Figure 6:
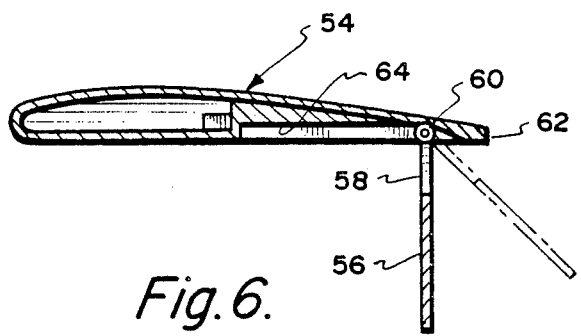
FIG. 6 is a view similar to FIG. 5 of a further modified form of flap assembly of the present invention where the hinge axis for the flap assembly is located at the trailing edge of the wing.

Referring particularly to FIG. 6 there is shown a modified version wing 54 wherein the flap 56 is attached by brackets 58 to a hinge axis 60. This hinge axis 60 is located directly adjacent the trailing edge 62 of the wing 54. It is to be noted that the movement of the flap 56 is counterclockwise from the stowage compartment 64 where the movement of flaps 28 and 38 is clockwise. Flap 56 is shown in transverse cross-section to be similar to flap 28. However, it is to be understood that it could be an airfoil shape if such is deemed desirable.

Figure 7:
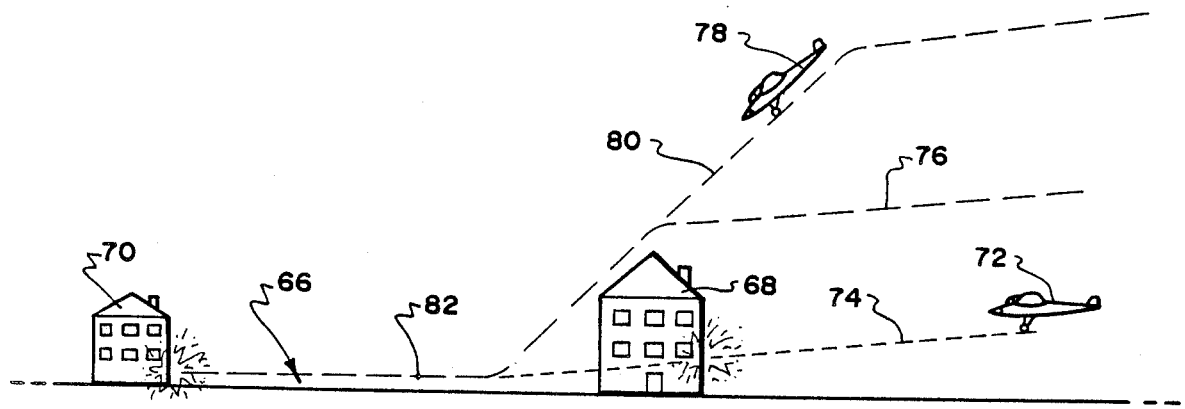
FIG. 7 is a diagrammatic view illustrating landing of the aircraft of the present invention in a confined runway area while also depicting landing of a conventional aircraft in the same runway length.

Within FIG. 7, there is depicted an aircraft runway 66. For purposes of description, there is shown a building 68 at the fore end of this runway 66 and another building 70 located at the aft end of this runway 66. If an aircraft 72 were to fly in on a shallow glide path 74, very possibly the aircraft could strike the building 68 in attempting to land. If the aircraft decided to land to avoid building 68 by using a steeper glide path 76, then very likely the aircraft could contact the building 70 at the end of the runway 66. However, using the flap assembly 26 of this invention, the aircraft 78 can assume a steep angle of descent as shown by glide path 80. After contacting of the runway 66, the aircraft goes only a short distance until point of stopping at point 82. Therefore, by using the flap assembly 26 of this invention, both housing structures 68 and 70 are easily avoided.

Figure 8:
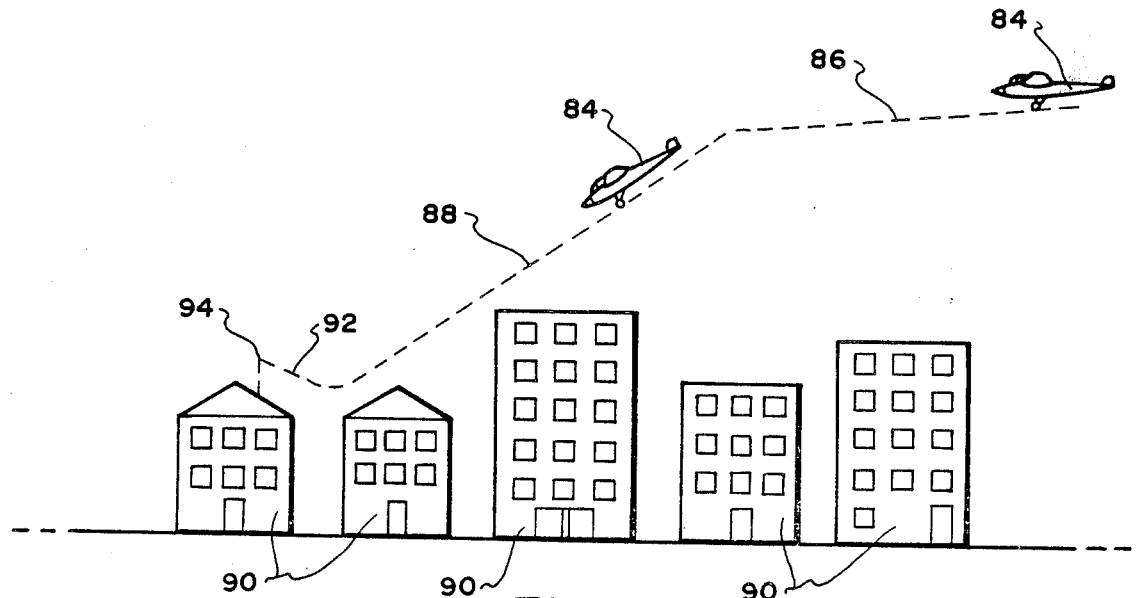
FIG. 8 is a diagrammatic view illustrating a proposed emergency landing of an aircraft which includes the flap assembly of the present invention.

Referring particularly to FIG. 8, there is depicted an emergency landing procedure by aircraft 84. It is to be assumed that the aircraft is in a slow conventional glide 86 and at the start at the emergency landing procedure begins a steep descent 88. The pilot deploys the flap assembly 26 which slows the aircraft 84 as it approaches the ground. Let it be assumed that the aircraft is coming into a housing area represented by house 90. The pilot only needs to pull the nose of the aircraft 84 up as the aircraft 84 approaches one of the houses which will cause the aircraft 84 to assume a steep upturn 92. It is to be remembered that this aircraft 84 is going at a slow speed and while making this upturn 92 the aircraft 84 will quickly stall at point 94. From point 94, the aircraft 84 will merely fall such as on top of one of the houses 90. If this type of emergency landing procedure is done right, the fall onto the house 90 can be very slight and can result in minimal damage to both the aircraft 84 and the house 90. Also, the possibility of injury to the occupant of the aircraft 84 is significantly lessened. Of course, most emergency landings will occur on ground rather than some structure.

What is claimed is:

1. In combination with an aircraft wing, said aircraft wing having a leading edge and a trailing edge, said aircraft wing having a top surface and an undersurface, said undersurface being substantially planar, a flap assembly hingedly mounted on a hinge axis on said undersurface, said flap assembly including a single flap, said flap being essentially planar, said flap being elongated and narrow and when deployed against the airstream causes substantial resistance to the moving of the aircraft wing through the air, said flap being movable from a stowage position to a deployed position, said stowage position being when the plane of said flap is located parallel to the plane of said undersurface of said aircraft wing, said deployed position being when the plane of said flap is positioned across the airstream with said flap being spaced from said undersurface and located perpendicular to said undersurface, said flap assembly including an air gap area between said flap and said undersurface with said flap in said deployed position, said aircraft wing having a cord "C" and a length "L", said flap having a length "$L_1$" and a cord "F", the depth between said undersurface and said flap of said air gap area being substantially constant and defined as "$F_1$", the improvement comprising:

the surface area of said flap (F x $L_1$) facing into the airstream is between the range of one-fourth to one-sixth of the wing area (C x L), said hinge axis being located at five-eighths of the cord (C) from said trailing edge.

* * * * *